United States Patent
Harrell et al.

(10) Patent No.: US 12,180,010 B2
(45) Date of Patent: Dec. 31, 2024

(54) DETECTION OF CONVEYOR BELT CONDITION

(71) Applicant: John Bean Technologies Corporation, Chicago, IL (US)

(72) Inventors: Ryan C. Harrell, Clyde, OH (US); Owen E. Morey, Huron, OH (US)

(73) Assignee: John Bean Technologies Corporation, Chicago, IL (US)

( * ) Notice: Subject to any disclaimer, the term of this patent is extended or adjusted under 35 U.S.C. 154(b) by 109 days.

(21) Appl. No.: 18/003,046

(22) PCT Filed: Jun. 22, 2021

(86) PCT No.: PCT/US2021/038360
§ 371 (c)(1),
(2) Date: Dec. 22, 2022

(87) PCT Pub. No.: WO2021/262640
PCT Pub. Date: Dec. 30, 2021

(65) Prior Publication Data
US 2023/0257208 A1    Aug. 17, 2023

Related U.S. Application Data

(60) Provisional application No. 63/042,708, filed on Jun. 23, 2020.

(51) Int. Cl.
*B65G 43/02* (2006.01)
*B65G 13/02* (2006.01)
(Continued)

(52) U.S. Cl.
CPC .......... *B65G 43/02* (2013.01); *B65G 13/02* (2013.01); *B65G 21/18* (2013.01); *B65G 23/14* (2013.01);
(Continued)

(58) Field of Classification Search
CPC ........ B65G 43/08; B65G 13/02; B65G 21/18; B65G 23/14
(Continued)

(56) References Cited

U.S. PATENT DOCUMENTS 5,505,293 A * 4/1996 Ochs ............... B65G 21/18
198/810.04
10,023,397 B1 * 7/2018 Brown .............. H04L 67/125
(Continued)

FOREIGN PATENT DOCUMENTS

| EP | 3220122 A1 * | 9/2017 | ............. B65G 21/18 |
| EP | 3 647 239 A1 | 5/2020 | |
| JP | 2017201299 A | 11/2017 | |

OTHER PUBLICATIONS

International Search Report and Written Opinion mailed Oct. 14, 2021, issued in corresponding International Patent Application No. PCT/US2021/038360, filed Jun. 22, 2021, 12 pages.

"Compare Predictive vs. Condition-Based Maintenance," <https://www.onupkeep.com/learning/maintenance-types/predictive-condition-based> [retrieved Sep. 28, 2021], Nov. 16, 2019, 5 pages.
(Continued)

*Primary Examiner* — James R Bidwell
(74) *Attorney, Agent, or Firm* — Christensen O'Connor Johnson Kindness PLLC (57) ABSTRACT

A system for monitoring at least one of the damaged physical condition, orientation and location of the upright side links of a spiral, self-stacking conveyor belt, the side links disposed along the side margins of the conveyor belt and the side links on one tier configured to stack on top of the side links of an underlying tier. The monitoring system includes a sensor for acquiring data pertaining to at least one of the damaged physical condition, orientation and location of the conveyor belt side links. The monitoring system also including a processing system for receiving and analyzing
(Continued)

the data from the sensor to determine at least one of the damaged physical condition and orientation of the side links and the locations of the side links, and to determine if maintenance of or remedial action to the conveyor belt is necessary.

20 Claims, 7 Drawing Sheets

(51) Int. Cl.
  *B65G 21/18* (2006.01)
  *B65G 23/14* (2006.01)
  *B65G 43/06* (2006.01)
(52) U.S. Cl.
  CPC ...... *B65G 43/06* (2013.01); *B65G 2203/0275* (2013.01); *B65G 2203/043* (2013.01); *B65G 2203/044* (2013.01); *B65G 2207/24* (2013.01)
(58) Field of Classification Search
  USPC ............................................ 198/778, 810.02
  See application file for complete search history.

(56) References Cited

U.S. PATENT DOCUMENTS

| | | | | |
|---|---|---|---|---|
| 2012/0247929 | A1* | 10/2012 | Heber | ................... B65G 43/02 |
| | | | | 198/810.01 |
| 2016/0194154 | A1* | 7/2016 | Matsuzaki | ................ A23L 3/06 |
| | | | | 198/778 |
| 2019/0190978 | A1 | 6/2019 | Brown | |
| 2020/0130946 | A1* | 4/2020 | Morey | ................... B65G 23/14 |

OTHER PUBLICATIONS

Malovany, D., "Maintaining Perfect Order," Equipment Belting/Conveyors, www.bakingandsnack.com, <https://staticl.squarespace.com/static/5e5d5c881eeee1d02b79372b9/t/5e79dfb443a2c54bbca136e8/1585045429572/103_bs_feb18_conveyors.pdf> [retrieved Sep. 24, 2021], Feb. 15, 2018, 5 pages.
Wikipedia, "Predictive Maintenance—Wikipedia," https://en.wikipedia.org/w/index.php?title=Predictive_maintenance&oldid=938317032 [retrieved Sep. 28, 2021], Jan. 30, 2020, 8 pages.

\* cited by examiner

DETECTION OF CONVEYOR BELT CONDITION

CROSS-REFERENCE TO RELATED APPLICATION

This international patent application claims priority to U.S. Provisional Application No. 63/042,708, filed on Jun. 23, 2020, the entire disclosures of which are hereby incorporated by reference herein for all purposes.

BACKGROUND

Self-stacking endless conveyor belts are commonly used for freezing or cooking food products. Such belts typically are composed of belt structures constructed with upright side links disposed along the side margins of the conveyor belt and at least two parallel, transversely extending rods interconnecting the side links. Such belt structures are interconnected to each other so that the belt is able to turn laterally as well as vertically.

Typically, the upright side links include an outer plate half or section and an inner plate half or section that are offset slightly from each other by a bridging section. This enables the inner plate section of the link structure to extend over the inside surface of the outer plate section of the adjacent link structure. The other plate section of the link structure and the inner plate section of an adjacent link structure are interconnected in overlapping relationship to allow relative sliding therebetween as the belt moves along its travel path, especially as the belt changes direction of travel.

The conveyor belt may be arranged to travel in a straight path until it enters a spiral or helical configuration. When in helical configuration, the lowermost tier of the conveyor belt is supported by a drive system, which separately drives each side of the conveyor belt. Each of the remaining tiers of the spiral stack is supported by an underlying tier. The interface between adjacent tiers is designed to keep the belt supported and laterally aligned.

During use, the upper edge of the link structure of the underlying tier normally contacts bottom edge surfaces of the link structure of the overlying tier. The upper edge of the link structure of a lower tier thus rests against lower edge portions of the overlying tier and is laterally constrained by guide tabs projecting from the side links of the overlying tier.

When moving in a helical configuration, longitudinally aligned tensile forces are applied to the belt causing it to stretch in the direction of travel. Also, when the bell travels in the helical path, the belt is stacked in circular tiers, and stress may be created that may act as a bending force tending to bend the link structures. Moreover, when the belt is stacked in tiers the contact surfaces or points between the side links and underlying and overlying surfaces gradually wear, which eventually can lead to damage and even failure of the side links.

Also, if the two drive chains driving the lowermost tier are not coordinated side to side, the side links of a link structure may not remain in lateral alignment, but may become skewed relative to each other. These conditions can cause the side links to become bent or otherwise deformed. Also, the guide tabs of the side links may become bent or otherwise damaged.

If the wear or damage to the side links is severe enough the tiers of the conveyor may not properly stack on top of each other, which can cause catastrophic failure of the conveyor belt. As such, it would be advantageous to continuously monitor the condition of the conveyor belt, including the physical condition and configuration of the side links. However, to date no accurate system exists for such monitoring. The disclosure of the present application seeks to address this shortcoming.

SUMMARY

In accordance with one embodiment of the present disclosure, a system is provided for monitoring the operation and condition of a spiral, self-stacking conveyor belt arranged in stacked tiers, the belt composed of upright side links disposed along the side margins of the conveyor belt, with the side links on one tier configured to stack on top of the side links of an underlying tier. The monitoring system comprises a sensor for acquiring data pertaining to the physical configuration and orientation of the conveyor belt side links and a processing system for receiving and analyzing the data from the sensor, the processing system comprising a processor to determine at least one of the physical configuration and orientation of the side links and the locations of the side links and to determine if maintenance of or remedial action to the conveyor belt is necessary based on the analyzed data from the sensor.

In any of the embodiments described herein, wherein the sensor is spaced from the side links.

In any of the embodiments described herein, wherein the sensor receives optical, sonic or magnetic data related to the physical configuration or orientation of the belt side links.

In any of the embodiments described herein, wherein the processing system analyzes the data from the sensor to determine if the conveyor belt has been damaged or is likely to be damaged based on the ascertained condition of the side links.

In any of the embodiments described herein, wherein the processor system analyzes the data from the sensor to determine if servicing of the conveyor belt is needed.

In any of the embodiments described herein, wherein the processor system analyzes the data from the sensor to determine if the useful life of the conveyor has been affected.

In any of the embodiments described herein, wherein the side links comprise an outer plate section, an inner plate and a bridging plate section between the outer and inner plate sections, and wherein the sensor senses the physical configuration of at least one of the outer plate section, inner plate and bridging plate section.

In any of the embodiments described herein, wherein the side link also comprises a foot structure extending laterally from the bottom of an outer plate section and the sensor senses the physical configuration of the foot structure.

In any of the embodiments described herein, wherein the side link also comprises a nesting tab extending laterally from the bottom portion of an inner plate section to laterally constrain the vertically adjacent side tabs and the sensor senses the physical configuration of the nesting tab.

In any of the embodiments described herein, wherein the processor analyzes the data from the sensor to determine the orientation of the side links.

In any of the embodiments described herein, wherein the processor analyzes the deviation of the side links from the vertical.

In any of the embodiments described herein, further comprising a storage medium to receive and store the data from the sensor.

In any of the embodiments described herein, wherein the storage medium is at a location remote from the sensor.

In any of the embodiments described herein, wherein the storage medium is at a location remote from the processing system.

In any of the embodiments described herein, wherein the processing system creates virtual models of the side links.

In any of the embodiments described herein, wherein the processing system creates a virtual model of the conveyor belt.

In accordance with one embodiment of the present disclosure, a method is provided for monitoring the operation and condition of a spiral, self-stacking conveyor belt arranged in stacked tiers, the belt composed of upright side links disposed along the side margins of the conveyor belt, with the side links on one tier configured to stack on top of the side links of an underlying tier. The monitoring system comprises using a sensor to acquire data pertaining to the physical configuration and orientation of the conveyor belt side links, and processing the data from the sensor to determine at least one of the physical configuration and orientation of the side links and the location of the side link and to determine if maintenance of or remedial action to the conveyor belt is necessary based on the analyzed data from the sensor.

In any of the embodiments described herein, further comprising spacing the sensor from the side links.

In any of the embodiments described herein, further comprising receiving optically, sonically, or magnetically based data related to the physical configuration or orientation of the belt side links.

In any of the embodiments described herein, further comprising using the processing system analyzes the data from the sensor to determine if the conveyor belt has been damaged or is likely to be damaged based on the ascertained condition

DESCRIPTION OF THE DRAWINGS

The foregoing aspects in many of the intended advantages of this invention will become more readily appreciated as the same becomes better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all the specific details. In some instances, well-known process steps have not been described in detail in order not to unnecessarily obscure various aspects of the present disclosure.

Further, it will be appreciated that embodiments of the present disclosure may employ any combination of features described herein. The present application may include references to "directions," such as "forward," "rearward," "front," "back," "ahead," "behind," "upward," "downward," "above," "below;" "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

Figure 1:
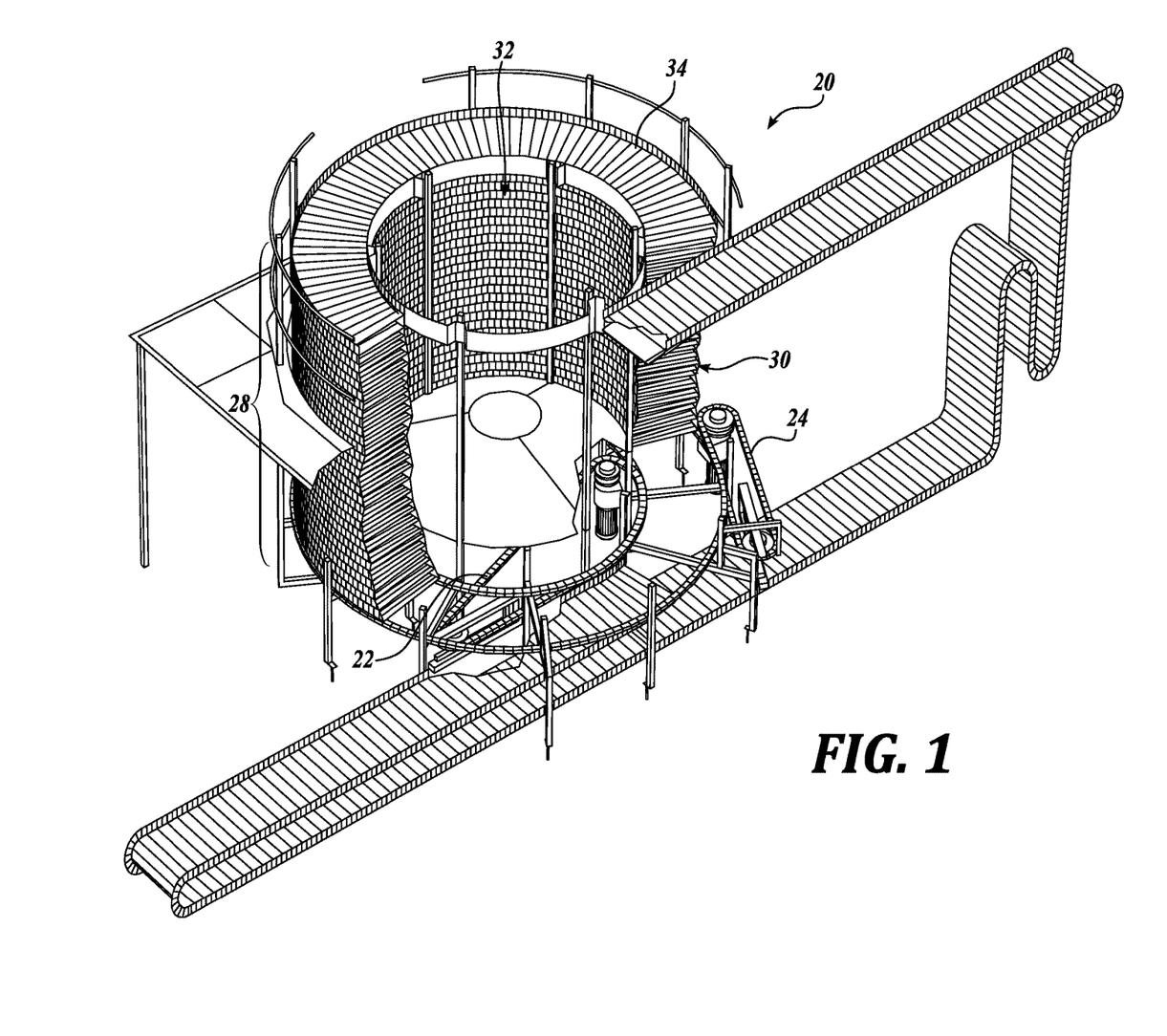
FIG. 1 is an isometric view of the spiral stacking conveyor belt system including a self-stacking conveyor belt and a drive system for driving the conveyor belt.
Figure 2:
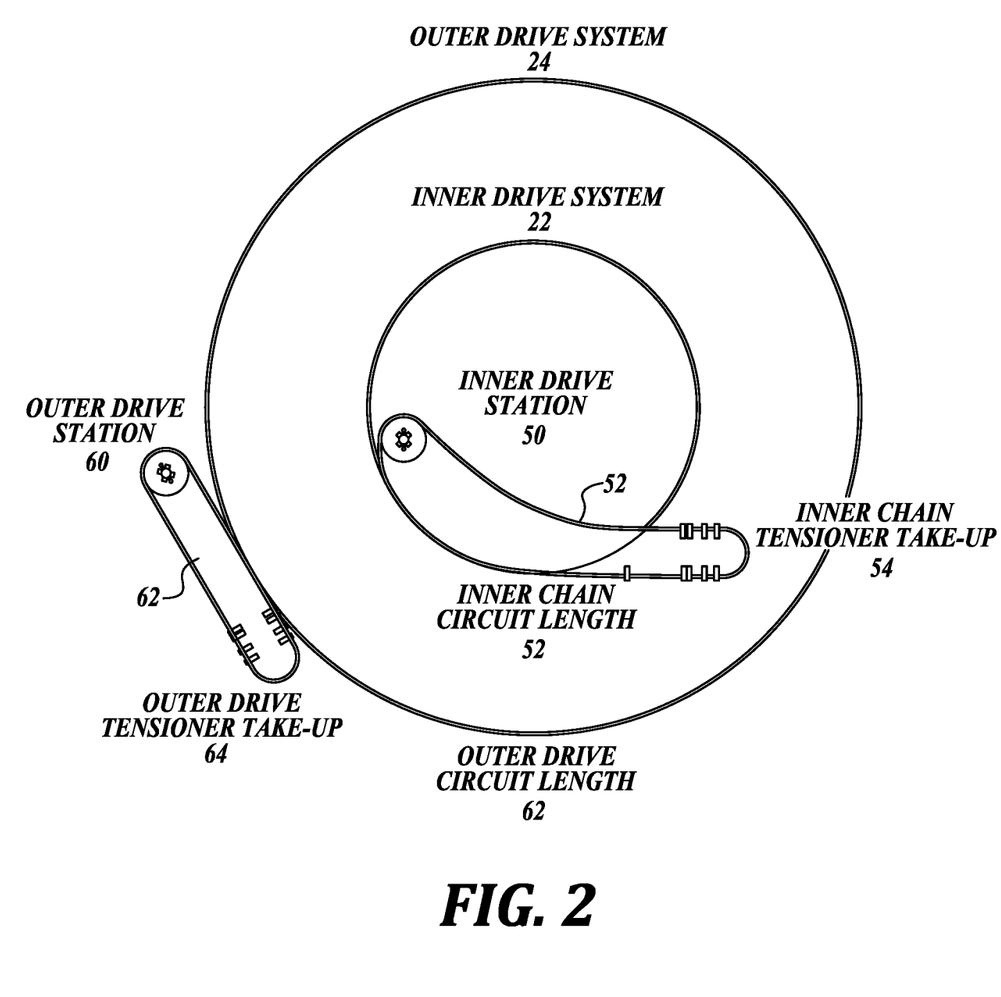
FIG. 2 is a top view illustrating the drive system of the spiral stacking conveyor belt system of FIG. 1.
Figure 3:
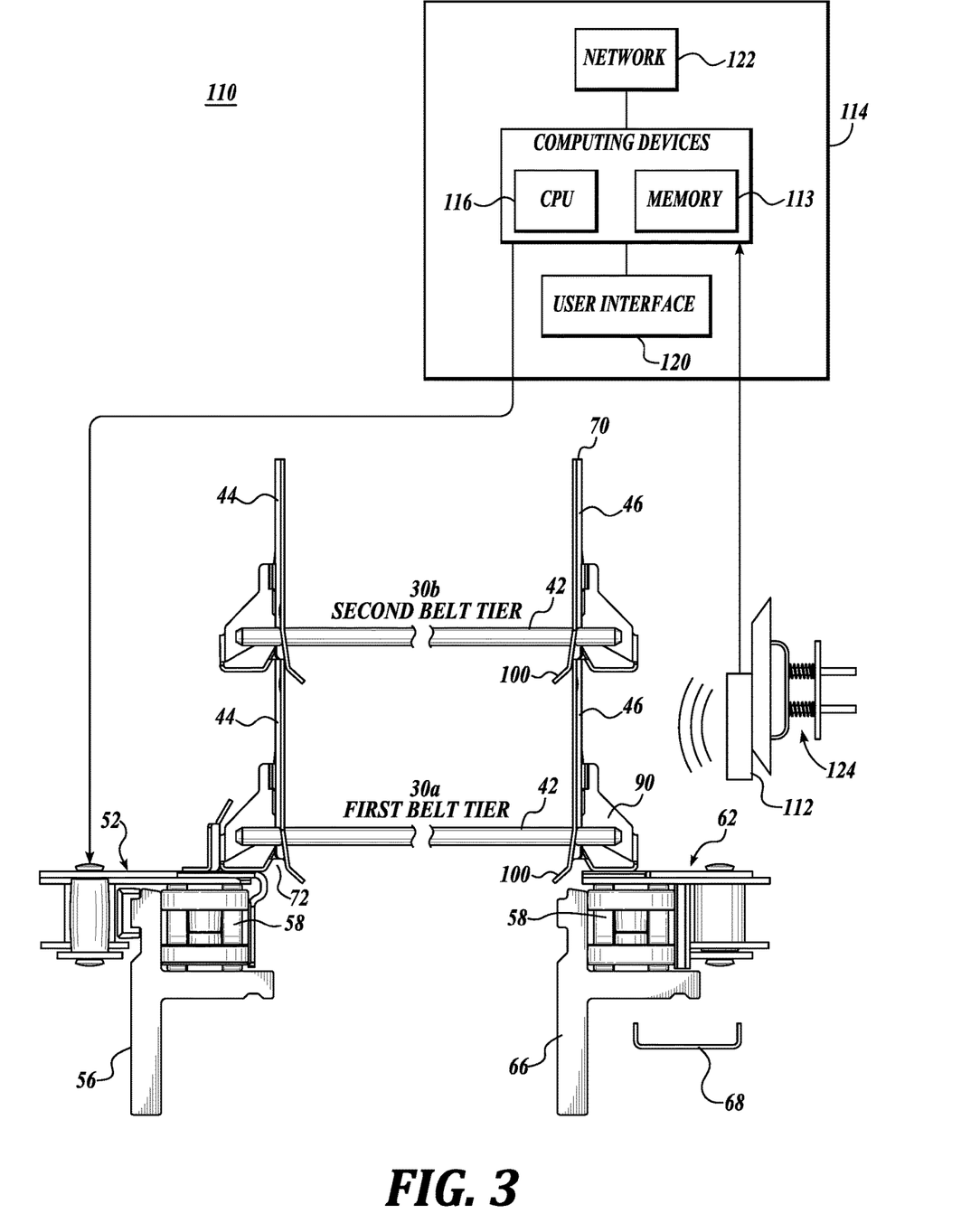
FIG. 3 is a cross-sectional view of the spiral stacking conveyor belt system of FIG. 1 showing the first and second tiers of the conveyor stacked on top of each other, with the lower tier driven by the drive system.

Referring to FIGS. 1-3, embodiments of the present disclosure are directed to spiral self-stacking conveyor belt systems 20 driven by inner and outer drive systems 22 and 24 and components thereof. Such spiral self-stacking conveyor belt systems 20 are used in continuous heating and freezing operations, for example, cooking, proofing, drying, and freezing of food. The inner and outer drive systems 22 and 24 are generally manufactured from stainless steel components for corrosion resistance.

Suitable embodiments of spiral self-stacking conveyor belts are shown and described in U.S. Pat. No. 3,938,651, issued to Alfred et al., and U.S. Pat. No. 5,803,232, issued to Frodeberg, the disclosures of which are hereby expressly incorporated by reference. However, other suitable spiral belt assemblies are also within the scope of the present disclosure. Also, a self-stacking spiral conveyor belt 34 is shown in FIG. 4, as discussed below.

Referring to FIG. 1, when formed as a spiral stack 28, the pervious conveyor belt 34 (see perspective view in FIG. 4) is configured into a plurality of superimposed tiers 30 that are stacked on top of each other (i.e., known in the art as "self-stacking" conveyor belt). In that regard, each tier 30 of the stack 28 forms a pervious annulus, through which gaseous cooking or cooling medium may travel, whether for cooking or freezing systems. When formed in a spiral stack 28, the plurality of tiers 30 creates an inner cylindrical channel 32, through which the gaseous medium may also travel. Workpieces (such as food products) travel on the conveyor belt 34 and are thermally processed (either cooked or frozen) by gaseous medium in the cooking or freezing chamber. Exemplary spiral stacks 28 may have any number of tiers 30, typically in the range of about 8 to about 25 tiers for ovens, and typically in the range of about 30 to about 45 tiers for freezers.

Figures 4A, 4B:
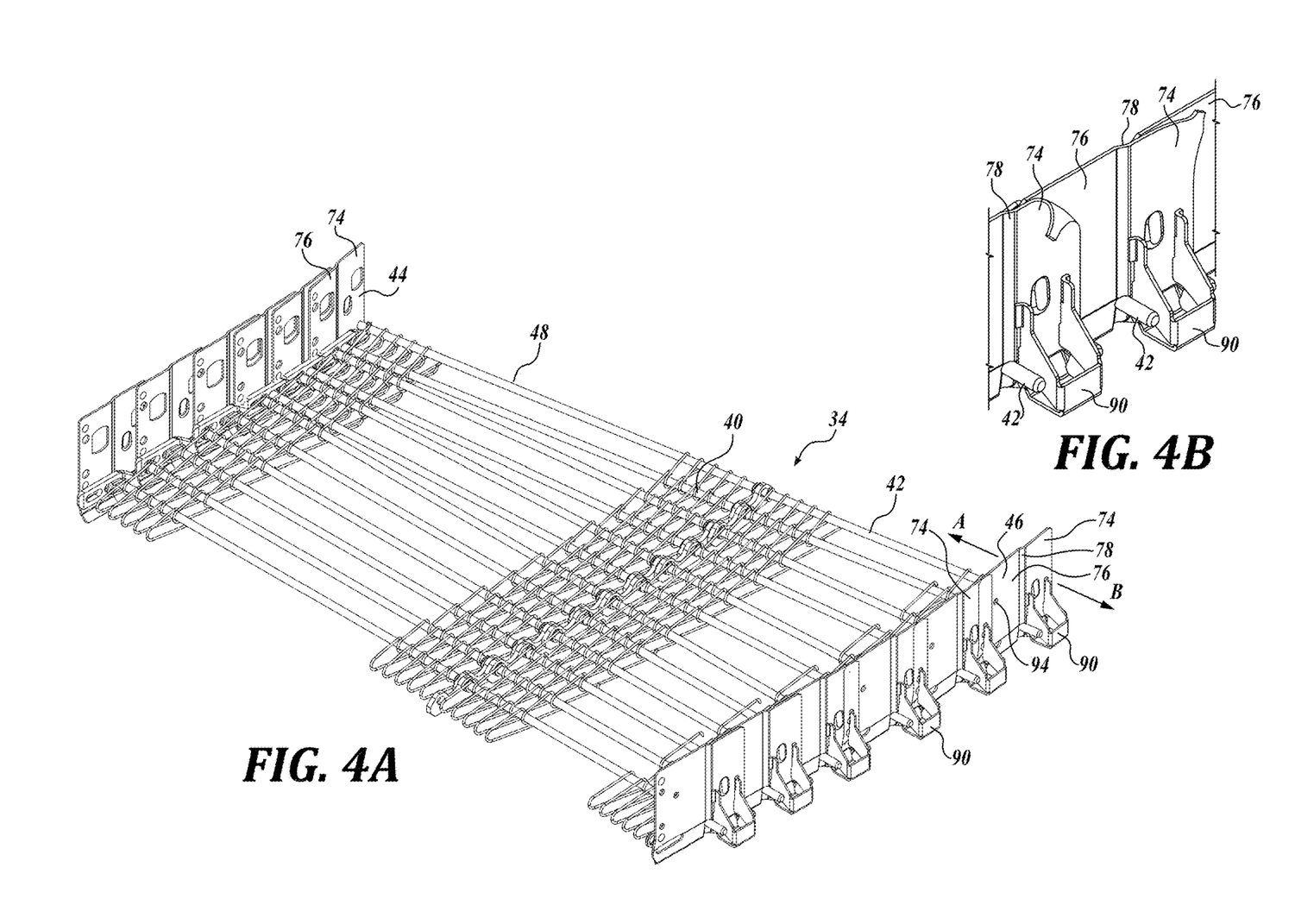
FIG. 4A is an isometric view of the section of the conveyor belt of the spiral stacking conveyor belt system of FIG. 1.
FIG. 4B is an isometric view of two adjacent side links of the conveyor belt shown in damaged condition.
Figure 5:
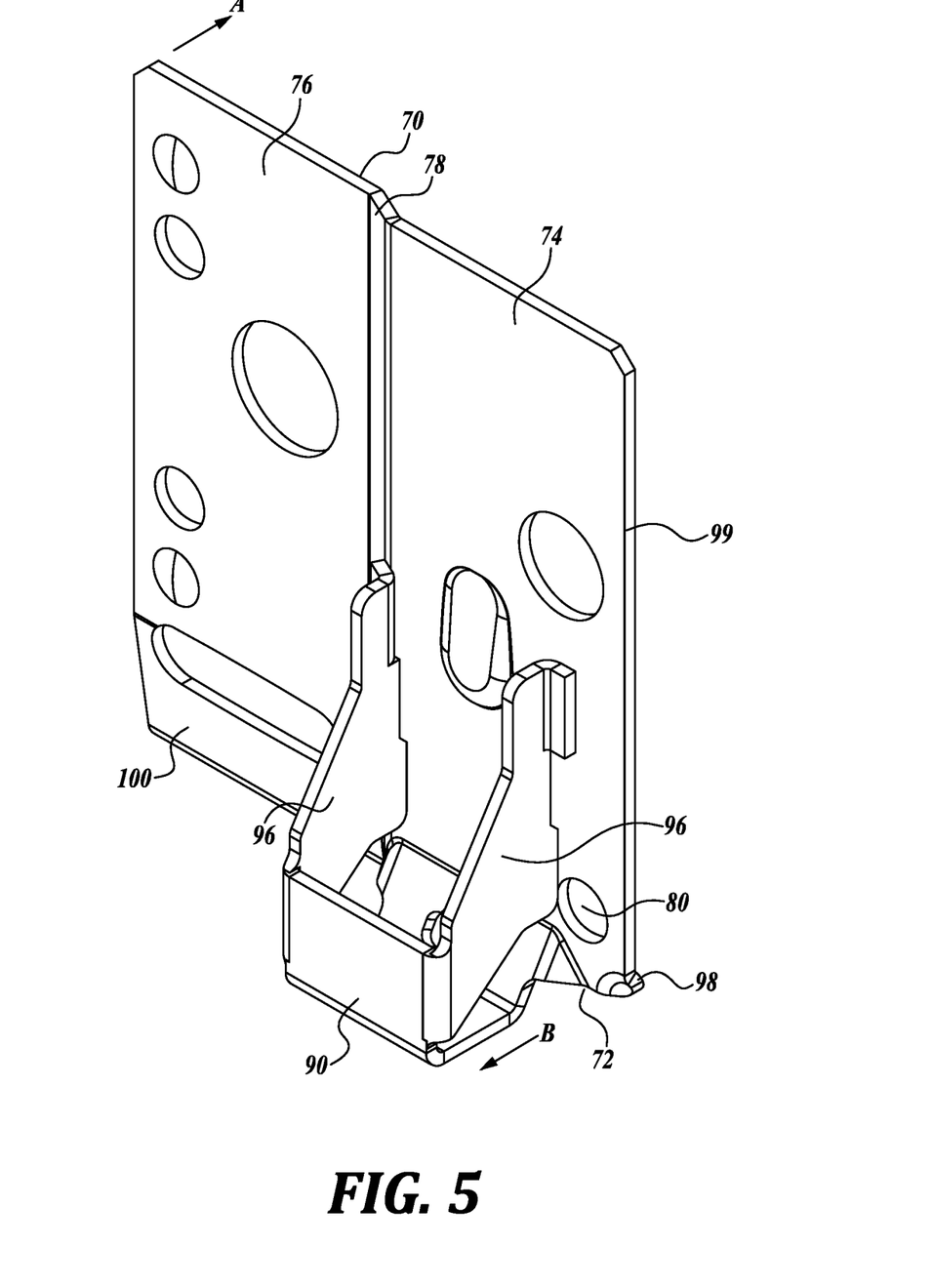
FIG. 5 is an enlarged isometric view of a side link taken from the exterior of the conveyor belt.
Figure 6:
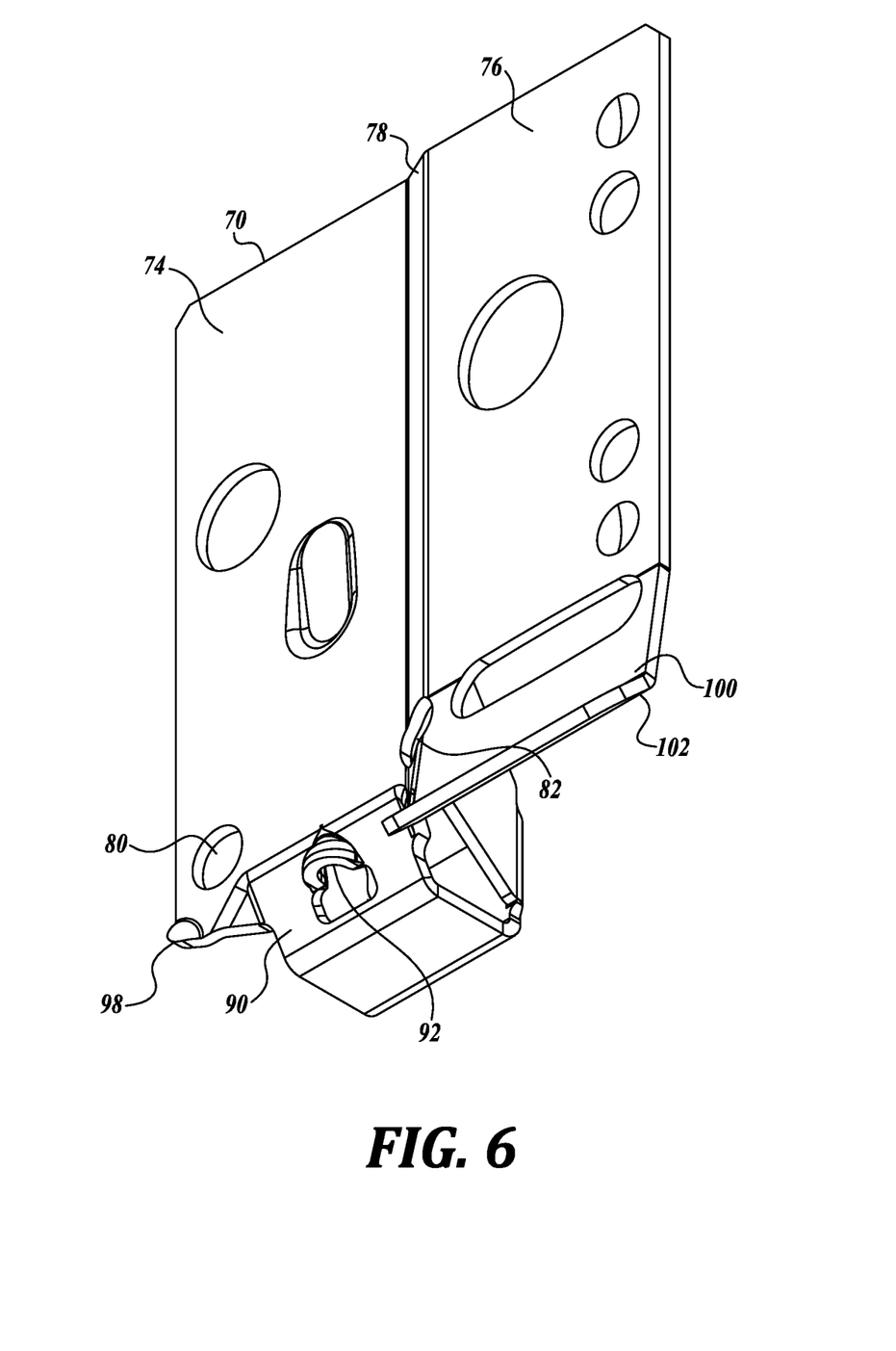
FIG. 6 is an isometric view of the side link shown in FIG. 5 but from the opposite side of the side link.
Figure 7:
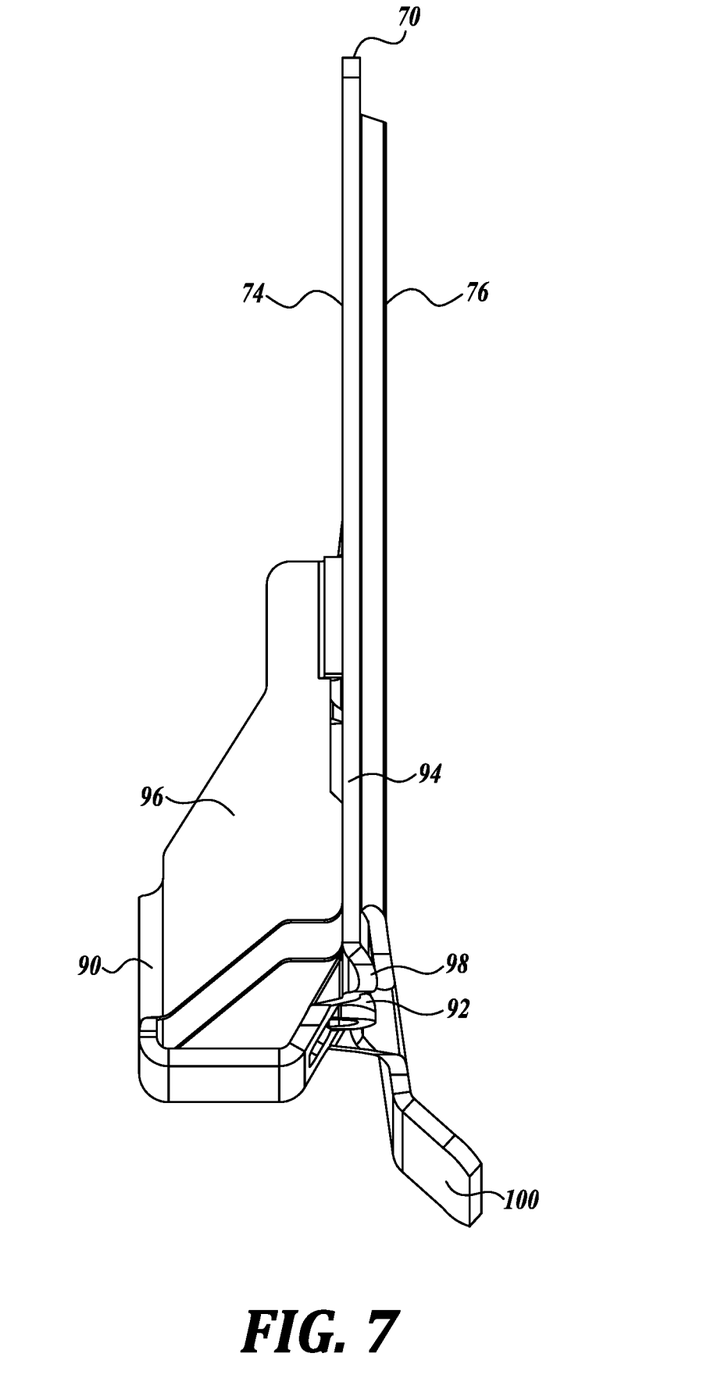
FIG. 7 is an end view of side link of FIG. 5 showing the lower or bottom portion of the side link and particularly the locations on the lower portion of an upper side link against which the upper edge portion of a side link of a lower tier rests.

Referring to FIG. 4, as a non-limiting example, the conveyor belt 34 may be in the form of a pervious belt mesh 40 for conveying workpieces and formed by transverse rods 42 interconnected by intermediate links, as well as inner and outer side links 44 and 46 at the ends of the transverse rods 42. The inner and outer side links 44 and 46 and the two transverse rods 42 that are connected there between form a belt link structure 48. The inner and outer side links 44 and 46 are configured to enable spiral self-stacking of the belt tiers 30 and for interaction with the drive system (see for example FIG. 3). When the conveyor belt 34 is configured as a spiral stack 28, gaseous medium may travel in a substantially vertical direction through the pervious belt mesh 40 of each superimposed tier 30

Referring to FIGS. 2 and 3, the conveyor belt 34 in the illustrated embodiment of FIG. 1 is driven by a drive system including inner and outer drive systems 22 and 24. The inner side links 44 are driven by an inner drive system 22 (including inner drive chain 52), and the outer side links 46 are driven by an outer drive system 24 (including outer drive chain 62). As seen in FIG. 2, the inner drive system 22 includes an inner drive station 50, an inner drive chain 52, and an inner chain tensioner take up 54. The outer drive system 24 includes an outer drive station 60, an outer drive chain 62, and an outer chain tensioner take up 64. The inner and outer drive chains 52 and 62 each include a plurality of links arranged in a continuous loop.

Because the conveyor belt 34 is configured to move in a spiral configuration, the inner and outer drive systems 22 and 24 drive the inner and outer edges of the conveyor belt 34 at different speeds to achieve the correct spiral belt motion. In some embodiments, the speed of the outer drive chain 62 is about two times as fast as the speed of the inner drive chain 52. If the speeds of the drive systems 22 and 24 are not synchronized, the speeds of the inner and outer drive chains 52 and 62 may not be coordinated, causing the side links 44 and 46 of a link structure 48 to not be in lateral alignment across the conveyor belt from each other. As discussed below; as a result, the tiers 30 may not properly stack on each other, causing deformation or other damage of the side links 44 and 46.

Referring to FIG. 3, the inner drive chain 52 is supported by an inner rail 56 and the outer drive chain 62 is supported by an outer rail 66. The inner and outer rails 56 and 66 also may include optional drip plates 68. For example, see the outer rail drip plate 68.

In the illustrated embodiment, the inner and outer drive chains 52 and 62 are roller chains. Therefore, when driven, rollers 58 enable movement of the inner and outer drive chains 52 and 62 along the inner and outer rails 56 and 66. Ball chains are also within the scope of the present disclosure, for example, as described in U.S. Pat. No. 4,899,871, the disclosure of which is expressly incorporated by reference herein.

As illustrated in FIG. 3, in order to form the helical path of the self-stacking endless conveyor belt 34, the side links 44 and 46 act as vertical spacers, wherein the upper edge portions of 70 of the side links 44 and 46 in an underlying belt tier 30 bears against the lower edge portions 72 of the side links in an overlying belt tier 30, and thus support the overlying belt tier via the respective edge portions 70.

The side links 44 and 46 each include a leading outer plate section 74, and inner plate section 76 and bridging plate section 78 that bridge the outer and inner plate sections 74 and 76. Although the plate portions 74 and 76 are shown as substantially planar, the plate portions can be contoured, for example, for reinforcement.

The inner plate section 76 is offset in the inner direction "A" with respect to the outer plate section 74. Although not required, the offset is preferably at least the thickness "T" of the plate material constituting the side links 44 and 46, and at most two times the thickness of such plate material.

The inner plate section 76 being offset relative to the outer plate section 74 enables the outer plate section 74 of an adjacent side link to extend over the outer surface of the inner plate section 76 on the adjacent side link, see FIG. 4. During assembly, the inner plate section 76 on one side link and the outer plate section 74 on the adjacent side link overlap and enables thereby the adjacent side links to slide together as the belt 34 moves from the straight or helical path, respectively.

The side links 44 and 46 include a first rod connection opening 80 and the second rod connection opening 82. The first rod connection opening 80 is arranged in the bottom of the outer plate section 74. The second rod connection opening 82 is arranged in the bottom part of the bridging section 78. Each rod connection opening 80, 82 is arranged to receive the end portion of a transverse rod 42. Normally, when producing a conveyor link structure 48, two opposite and mirrored side links 44, 46 are joined together by means of two transverse connecting rods 42. The rods 42 are introduced into respective rod connection openings 80/82 and the weld is positioned between, respectively, the rods and the side links 44 and 46 adjacent to, respectively, the rod openings 80 and 82, thereby to fixedly fasten the rods 42 to the side links 44 and 46. Normally, the rods 42 extend perpendicularly with respect to the planes of the outer and inner plate sections.

The outer plate section 74 includes a formed bottom or foot structure 90 connected to a bottom edge of the other plate section 74. The bottom/foot structure 90 extends from the outer plate section 74 in the outward direction "B". The bottom structure 90 includes a formed (pressed) resting surface 92 for bearing against the upper edge of the upper edge portion 70 of the side link of the next lower tier. The bottom structure also includes two welding surfaces 96 to which the adjacent end of the transverse rods 42 are welded. The two welding surfaces 96 onto which the ends of the transverse rods 42 are to be welded extend in a plane transverse to the plane of the outer plate section 74. Welding the transverse rods 42 to the welding surfaces 96 stiffens the side links 44 and 46, especially the lower part of the side links.

The upper edge 70 of the inner plate of a side link of an underlying tier contacts the resting surface 92 as well as to bottom surface of the bridging plate section 78 and a support tab 98 projecting laterally from the lower corner of the leading edge 99 of the outer plate section 74. Thus, the tiers of the conveyor belt 34 in the helical path are laterally aligned by resting the upper edge 70 of a side link of an underlying tier against the resting surface 92, the bottom surface of the bridging plate section 78, and the support tab 98 of the side link of the overlying tier.

The inner plate section 76 includes a nesting tab section 100 connected to the bottom edge of the inner plate section 76. The nesting tab section 100 comprises an abutment surface 102. The abutment surface 102 extends diagonally downward and inward (in the inward direction "A") from the bottom edge of the inner plate section 76. The abutment surface 102 limits inward lateral movement of a lower side link relative to an upper side link when the conveyor belt is in self stacking configuration. Moreover, the abutment surface 102 limits outward lateral movement of an upper side link over a lower side link when the conveyor belt is in self-stacked configuration. Thus, when a side link forms a part of a link structure of the conveyor belt 34, the abutment surfaces 102 of successive link structures 48 form inner abutment surfaces engaging the inner side of the upper portions of a link structure 48 of an underlying belt tier 30.

As can be appreciated, the side links 44 and 46 must be of specific configuration in order that the tiers 30 of the belt 34 stacked properly upon each other. This is especially true with respect to the bottom or foot structure 90 and the tab section 100 of the side links. It can be appreciated that if the side links are damaged so as to no longer be of the original physical configuration, the side links may not stack properly relative to each other and thereby negatively affect the operation of the conveyor belt 34.

As shown particularly in FIG. 3, the side links 44 and 46 are disposed vertically so that the conveyor tiers 30 are able to properly stack on top of each other. As will be appreciated, when the conveyor belt 34 is loaded, the load is carried by the transverse rods 42. The loads on the rods tend to cause the center of the rods to deflect somewhat downwardly, which in turn causes the ends of the rods attached to the side links 44 and 46 to tilt somewhat toward the longitudinal center of the belt. As a consequence, when the belt 34 is unloaded, the side links 44 and 46 are nominally tilted outwardly at their upper edges 70 away from the longitudinal center of the belt at about 2°. The amount of nominal tilt can be greater or less, depending in part on the load expected to be carried by the conveyor, which in turn will affect the deflection of the rods 42.

It can be appreciated that if the side links 44 and 46 are not substantially vertical when loaded, the upper edges 70 of the side links may not engage properly with the bearing surfaces of the next above belt tier 30. This in turn can cause damage to the nesting tab or the foot at the bottom of the cited link, or cause damage to the upper edge portion 70 of the side link outer plate section 74. Further, the leading edge of the cited link outer plate section can also be damaged. Examples of such damage to the side links are depicted in FIG. 4B.

The damage to the side links shown in FIG. 4B can occur for reasons other than the side links being of incorrect tilt or vertical orientation. As discussed above, if the drive system 22 and 24 of the drive chains 52 and 62 are not synchronized properly, the side links 44 and 46 of a link structure 48 may not be "square" with each other. Thus, the side links may not be aligned with the side links of the next upper tier as the side links enter the bottom of the belt stack 28 to form the bottom tier when driven by the inner and outer drive chains 52 and 62. Such misalignment can cause damage to the side links, for example, as shown in FIG. 4B.

The present disclosure includes a monitoring or sensing system 110 positioned relative to the conveyor belt 34 to sense the physical configuration of the belt side links 44 and 46 as well as the inclination or tilt of the side links. In basic form, the sensing system 110 includes a sensor 112 mounted on a mounting bracket assembly 124, as shown in FIG. 3. In addition, a computing system 114 operates with the sensor 112 to generate a virtual model not only of the belt side links 44 and 46, but also of the conveyor stack 20, in addition to controlling the operation of the conveyor based on the condition of the conveyor as determined by the sensing system 110. In this regard, the computing system 114 may determine that repair to the conveyor is needed at a future time or immediately, and in the latter situation may cause the conveyor to stop operating until the repair has been completed.

As shown in FIG. 3, the data or information gathered by the sensor 112 is transmitted to the computing system 114, which utilizes such data and information to ascertain the physical configuration of the conveyor belt and in particular the side links 44 and 46, as well as the vertical orientation or tilt of the side links and the location of the location link being analyzed with respect to the entire length of the conveyor belt.

As shown in FIG. 3, the computing system 114 includes a central processing unit 116, as well as a memory unit 113. In lieu of or in addition to the memory unit 113, the data from the sensor 112 can be transmitted to a remote location for secure storage. A user interface 120 in the form of a touch screen panel or other interface device may be provided to access the data from the sensor 112 as well as to input parameters for the physical condition of the conveyor belt, including the side links, which are to be maintained during the operation of the conveyor. As also shown in FIG. 3, the computing system 114 may be in communication with a network system 122 which enables the computing system to communicate with and share information with other computers. The computing system may also control other equipment and hardware associated with the conveyor belt system 20.

The sensor 112 can be of various types. For example, the sensor 112 can be optically based. Such sensor can be positioned to view the inner and outer side links 44 and 46 as the side links pass the sensor 112. The optical sensor can ascertain whether or not the side links, and especially the outer plate section 74, are of substantially planar configuration, as should be the case. The optical sensor can ascertain whether or not the outer plate section 74 is deformed or otherwise damaged, for example, as shown in FIG. 4B wherein the leading portions of the side link outer plate sections 74 are deformed.

In addition, the optical sensor can sense the condition of the bottom structure or foot 90 to determine whether the foot has been damaged. The optical sensor can also sense the configuration of the nesting tab 100 to ascertain whether the nesting tabs have been bent or otherwise damaged, including whether or not the nesting tabs can continue to perform their function.

In addition, by ascertaining the vertical height of the side links 44 and 46, it is possible to know whether the side links are in vertical orientation or tilted. Further, the direction of the tilt of the side links can be determined.

As noted above, the data and information from the optical sensor 112 is transmitted to the computing system 114, which can analyze such information and data used to create a virtual model of the side link being sensed. Further, because each side link is reviewed by the sensor 112, the computing system can create a virtual model of not only each side link, but of the entire conveyor belt 34.

Rather than being of an optical nature, the sensor 112 can instead be sonically or audibly based. Such sonic or audible sensor can provide the same information as described above with respect to the optical type sensor. Such sonic or audible sensors are articles of commerce.

As a further alternative, the sensor 112 may be magnetically based. Such magnetic proximity sensors sense the presence of a magnetic object, i.e., the target. The target (side link) can be characterized by its magnetic field. This information can be utilized to physically characterize the object being sensed, in this case the conveyor belt, and in particular the side links, and more particularly the outer plate section, inner plate section, the bottom structure or foot, and the nesting tab of the belt structure 48.

It is to be understood that the foregoing types of sensors are not intended to be exclusive or comprehensive, rather, other types of sensors may also be utilized, for example, x-ray sensors.

The sensor 112 may be mounted in desired position by the mounting structure 124, which is schematically illustrated in FIG. 3. Such mounting structure can be of numerous configurations with the goal to mount the sensor 112 in stationary position relative to the moving conveyor belt. The sensor 112 may be mounted within the thermal processing chamber wherein the conveyor stack 28 is located. Alternatively, mounting system 124 may be located outside of the processing chamber so as not to subject the sensor 112 to the potentially harsh physical conditions within the processing chamber.

Although a single mounting system 124 is illustrated in FIG. 3 to sense the outer side links 46, a comparable mounting system can also be utilized to mount one or more additional sensors so as to ascertain the condition of the inner side links 44.

In addition to ascertaining the physical condition or orientation and location of the individual side links, the monitoring system 110 the present disclosure can also determine the relative engagement of side links with each other. For example, the present system can determine whether the side links of vertically adjacent tiers are in the same vertical plane. In addition, it is possible to determine whether the side link is aligned with an adjacent side link of the same tier, and whether both of these side links are aligned with the travel direction of the conveyor belt. Moreover, it is possible to determine whether a side link is tracking the direction of the movement of the conveyor belt or whether the side link may be wobbling from side to side as it travels along the path of the conveyor belt. Sensing these conditions can indicate whether or not any of the side links are damaged or are worn so as to require maintenance in the future or perhaps even immediate repair so as to avoid damage to the conveyor belt that would cause a conveyor belt to cease to operate properly. If the latter is case, the computing system 114 is capable of identifying the location or locations of the damaged side link(s), rather than having to inspect each of the thousands of side links that may comprise a conveyor belt.

In addition to ascertaining whether preventative maintenance or repair of the conveyor belt is needed, the monitoring system of the present disclosure may also assist in predicting the remaining service life of the conveyor belt based at least in part of the physical condition of the side links. As a related matter, the monitoring system the present disclosure may be used to determine the entire expected service life of the conveyor belt by being used to monitor the conveyor belt from the time when first installed.

While illustrative embodiments have been illustrated and described, it will be appreciated that various changes can be made therein without departing from the spirit and scope of the invention. For example, it is also to be understood that other analysis of the conveyor belt may be conducted based on the data and information obtained by the sensor 112, in addition to that described above.

Also, although the side links 44 and 46 are described and illustrated as having substantially planer outer and inner plate sections, the side links can be constructed with reinforcement sections that are pressed into the plate sections. As such the plate sections can be contoured as shown, for example, as in U.S. Pat. No. 8,800,757, incorporated herein by reference. The monitoring system 110 of the present disclosure can be used to ascertain if such plate sections are contoured as originally manufactured, or if deformed or otherwise damaged.

The embodiments of the invention in which an exclusive property or privilege is claimed are defined as follows:

1. A system for monitoring at least one of the damaged physical condition, orientation, and location of the upright side links of a spiral, self-stacking conveyor belt arranged in stacked tiers, the side links disposed along the side margins of the conveyor belt, the side links on one tier configured to stack on top of the side links of an underlying tier, the monitoring system comprising:
   a sensor for acquiring data pertaining to at least one of the damaged physical condition, orientation, and location of the conveyor belt side links; and
   a processing system for receiving and analyzing the data from the sensor, the processing system comprising a processor to determine at least one of the damaged physical condition and orientation of the side links and the locations of the side links, and to determine if maintenance of or remedial action to the conveyor belt is necessary based on the analyzed data from the sensor.

2. The system according to claim 1, wherein the sensor is spaced from the side links.

3. The system according to claim 1, wherein the sensor receives optical, sonic or magnetic data related to the physical configuration or orientation of the belt side links.

4. The system according to claim 1, wherein the processing system analyzes the data from the sensor to determine at least one of the following:
   if the conveyor belt has been damaged or is likely to be damaged based on the ascertained condition of the side links;
   if servicing of the conveyor belt is needed;
   if the useful life of the conveyor has been affected.

5. The system according to claim 1, further comprising a storage medium to receive and store the data from the sensor.

6. The system according to claim 5, wherein the storage medium is at a location selected from the group consisting of remote from the sensor and remote from the processing system.

7. A system for monitoring at least one of the physical condition, orientation, and location of the upright side links of a spiral, self-stacking conveyor belt arranged in stacked tiers, the side links disposed along the side margins of the conveyor belt, the side links on one tier configured to stack on top of the side links of an underlying tier, the monitoring system comprising:
   a sensor for acquiring data pertaining to at least one of the physical condition, orientation, and location of the conveyor belt side links; and
   a processing system for receiving and analyzing the data from the sensor, the processing system comprising a processor to determine at least one of the physical condition and orientation of the side links and the locations of the side links, and to determine if maintenance of or remedial action to the conveyor belt is necessary based on the analyzed data from the sensor;

wherein the side links comprise an outer plate section, an inner plate, and a bridging plate section between the outer and inner plate sections; and wherein the sensor senses the physical condition of at least one of the outer plate section, inner plate, and bridging plate section.

8. The system according to claim 7, wherein:

the side link also comprises a foot structure extending laterally from the bottom of an outer plate section; and the sensor senses the physical configuration of the foot structure.

9. The system according to claim 7, wherein:

the side link also comprises a nesting tab extending laterally from the bottom portion of an inner plate section to laterally constrain the vertically adjacent side tabs; and the sensor senses the physical configuration of the nesting tab.

10. A system for monitoring at least one of the physical condition, orientation, and location of the upright side links of a spiral, self-stacking conveyor belt arranged in stacked tiers, the side links disposed along the side margins of the conveyor belt, the side links on one tier configured to stack on top of the side links of an underlying tier, the monitoring system comprising:

a sensor for acquiring data pertaining to at least one of the physical condition, orientation, and location of the conveyor belt side links; and a processing system for receiving and analyzing the data from the sensor, the processing system comprising a processor to determine at least one of the physical condition and orientation of the side links and the locations of the side links, and to determine if maintenance of or remedial action to the conveyor belt is necessary based on the analyzed data from the sensor; and wherein the processor analyzes at least one of: the data from the sensor to determine the orientation of the side links; and the deviation of the side links from the vertical.

11. A system for monitoring at least one of the physical condition, orientation, and location of the upright side links of a spiral, self-stacking conveyor belt arranged in stacked tiers, the side links disposed along the side margins of the conveyor belt, the side links on one tier configured to stack on top of the side links of an underlying tier, the monitoring system comprising:

a sensor for acquiring data pertaining to at least one of the physical condition, orientation, and location of the conveyor belt side links; and a processing system for receiving and analyzing the data from the sensor, the processing system comprising a processor to determine at least one of the physical condition and orientation of the side links and the locations of the side links, and to determine if maintenance of or remedial action to the conveyor belt is necessary based on the analyzed data from the sensor; and wherein the processing system creates virtual models of at least one of the side links and the conveyor belt.

12. A method of monitoring at least one of the damaged physical condition, orientation, and location of upright side links of a spiral, self-stacking conveyor belt arranged in stacked tiers, the side links disposed along the side margins of the conveyor belt, the side links on one tier configured to stack on top of the side links of an underlying tier, the monitoring system comprising:

using a sensor to acquire data pertaining to at least one of the damaged physical condition, orientation, and location of the conveyor belt side links; and processing the data from the sensor to determine at least one of the damaged physical condition and orientation of the side links and the location of the side link, and to determine if maintenance of or remedial action to the conveyor belt is necessary based on the analyzed data from the sensor.

13. The method according to claim 12, further comprising spacing the sensor from the side links.

14. The method according to claim 12, further comprising receiving optically, sonically, or magnetically based data related to the damaged physical configuration or orientation of the belt side links.

15. The method according to claim 12, further comprising using the processing system to analyze the data from the sensor to determine at least one of the following:

if the conveyor belt has been damaged or is likely to be damaged based on the ascertained condition of the side links;

if servicing of the conveyor belt is needed;

if the useful life of the conveyor has been affected.

16. The method according to claim 12, further comprising storing the data from the sensor in a storage medium located remotely from the sensor.

17. A method of monitoring at least one of the physical condition, orientation, and location of upright side links of a spiral, self-stacking conveyor belt arranged in stacked tiers, the side links disposed along the side margins of the conveyor belt, the side links on one tier configured to stack on top of the side links of an underlying tier, the monitoring system comprising:

using a sensor to acquire data pertaining to at least one of the physical condition, orientation, and location of the conveyor belt side links; and processing the data from the sensor to determine at least one of the physical condition and orientation of the side links and the location of the side link, and to determine if maintenance of or remedial action to the conveyor belt is necessary based on the analyzed data from the sensor;

wherein the side links comprise an outer plate section, an inner plate, a bridging plate section between the outer and inner plate sections, and a foot structure extending laterally from the bottom of an outer plate section; and further comprising sensing the physical condition of at least one of the outer plate section, inner plate, bridging plate section, and the physical configuration of the foot structure.

18. The method according to claim 17:

wherein the side link also comprises a nesting tab extending laterally from the bottom portion of an inner plate section to laterally constrain the vertically adjacent side tabs; and further comprising sensing the physical configuration of the nesting tab.

19. A method of monitoring at least one of the physical condition, orientation, and location of upright side links of a spiral, self-stacking conveyor belt arranged in stacked tiers, the side links disposed along the side margins of the conveyor belt, the side links on one tier configured to stack on top of the side links of an underlying tier, the monitoring system comprising:

using a sensor to acquire data pertaining to at least one of the physical condition, orientation, and location of the conveyor belt side links; and processing the data from the sensor to determine at least one of the physical condition and orientation of the side links and the location of the side link, and to determine if maintenance of or remedial action to the conveyor belt is necessary based on the analyzed data from the sensor; and further comprising using the processor to perform at least one of the following:

analyze the deviation of the side links from the vertical; and create virtual models of the side links.

20. A method of monitoring at least one of the physical condition, orientation, and location of upright side links of a spiral, self-stacking conveyor belt arranged in stacked tiers, the side links disposed along the side margins of the conveyor belt, the side links on one tier configured to stack on top of the side links of an underlying tier, the monitoring system comprising:

using a sensor to acquire data pertaining to at least one of the physical condition, orientation, and location of the conveyor belt side links; and processing the data from the sensor to determine at least one of the physical condition and orientation of the side links and the location of the side link, and to determine if maintenance of or remedial action to the conveyor belt is necessary based on the analyzed data from the sensor; and further comprising using the processing system to create virtual models of the side links.

* * * * *